(12) United States Patent
Kwon et al.

(10) Patent No.: US 7,449,864 B2
(45) Date of Patent: Nov. 11, 2008

(54) APPARATUS AND METHOD FOR CONTROLLING BATTERY DISCHARGE BETWEEN INTERNAL BATTERY AND EXTERNAL BATTERY

(75) Inventors: Se-an Kwon, Seoul (KR); In-don Ju, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 11/498,137

(22) Filed: Aug. 3, 2006

(65) Prior Publication Data
US 2007/0035279 A1   Feb. 15, 2007

(30) Foreign Application Priority Data
Aug. 9, 2005   (KR) .................. 10-2005-0072765

(51) Int. Cl.
  *H01M 10/44*   (2006.01)
  *H01M 10/46*   (2006.01)
(52) U.S. Cl. ..................................... 320/132
(58) Field of Classification Search ........... 320/107, 320/132, 149
  See application file for complete search history.

(56) References Cited
U.S. PATENT DOCUMENTS
7,002,265 B2 *   2/2006   Potega .................. 307/149

FOREIGN PATENT DOCUMENTS

| JP | 2003-51086 | 2/2003 |
|---|---|---|
| JP | 2004-94480 | 3/2004 |
| KR | 1995-21936 | 7/1995 |
| KR | 2000-10301 | 2/2000 |
| KR | 2000-33015 | 6/2000 |
| KR | 10-304610 | 7/2001 |

OTHER PUBLICATIONS

Office Action issued in Korean Patent Application No. 2005-72765 on Nov. 14, 2006.
Korean Patent Abstract Publication No. 1997-11060.

* cited by examiner

*Primary Examiner*—Edward Tso
(74) *Attorney, Agent, or Firm*—Stein, McEwen & Bui, LLP

(57) ABSTRACT

An apparatus for and a method of controlling battery discharge. A number of battery switching operations is minimized by detecting a remaining voltage capacity of each of a plurality of batteries supplying a battery-powered electronic device with power. The remaining voltage capacities of an internal battery and an external battery are detected and corresponding flags are set for the internal and external batteries according to predetermined conditions. A discharge status of at least one of the internal battery and the external battery is controlled by referring to the flags and a remaining voltage capacity of each of the internal battery and the external battery.

42 Claims, 7 Drawing Sheets

APPARATUS AND METHOD FOR CONTROLLING BATTERY DISCHARGE BETWEEN INTERNAL BATTERY AND EXTERNAL BATTERY

CROSS-REFERENCE TO RELATED APPLICATIONS

This application claims the benefit of Korean Application No. 2005-72765, filed Aug. 9, 2005, in the Korean Intellectual Property Office, the disclosure of which is incorporated herein by reference.

BACKGROUND OF THE INVENTION

1. Field of the Invention

Aspects of the present invention relate to an apparatus for and a method of controlling battery discharge, and more particularly, to an apparatus for and a method of controlling a battery discharge status, which minimizes a number of battery switching operations by detecting a remaining voltage capacity of each of a plurality of batteries for supplying a battery-powered electronic device with power.

2. Description of the Related Art

Portable electronic devices are generally battery-powered and may use multiple batteries to extend an operating time thereof. Typically, a dual battery system having an internal battery and an external battery is widely used.

In operating the dual battery system having an embedded internal battery and a detachable external battery, the external battery is first used and the internal battery is then used depending on the discharge status of the external battery to extend the operating time of the system.

FIG. 1 is a block diagram of a conventional apparatus having dual batteries and controlling battery discharge. The conventional apparatus includes an internal discharge controller 11, an internal discharge switch 12, an internal battery 13, an external discharge controller 15, an external discharge switch 16, an external battery 17, and a main controller 14.

The internal discharge controller 11 and the external discharge controller 15 control operations of the internal discharge switch 12 and the external discharge switch 16, respectively. The main controller 14 detects a remaining voltage capacity of each of the internal battery 13 and the external battery 17 to allow the internal discharge controller 11 and the external discharge controller 15 to control discharges of the internal battery 13 and the external battery 17, respectively. In addition, the main controller 14 allows a charger (not shown) to charge the internal battery 13 and the external battery 17.

The internal discharge switch 12 and the external discharge switch 16 are switched on or off according to commands issued from the internal discharge controller 11 and the external discharge controller 15, respectively, to determine which one of the internal battery 13 and the external battery 17 is to be used.

The main controller 14 controls the external discharge controller 15 to use the external battery 17 first. Accordingly, the external discharge controller 15 instructs circuitry of the external discharge switch 16 to allow the external battery 17 to be used.

Once the external battery 17 is used, the main controller 14 starts to detect the remaining capacity of the external battery 17. If the remaining capacity is smaller than a predetermined threshold, the main controller 14 controls the external discharge controller 15 to interrupt the use of the external battery 17. Accordingly, the external discharge controller 15 controls the circuit connected to the external discharge switch 16 so that the external battery 17 is not used.

In addition, the main controller 14 controls the internal discharge controller 11 to use the internal battery 13. Accordingly, the internal discharge controller 11 instructs circuitry of the internal discharge switch 12 to allow the internal battery 13 to be used.

While the internal battery 13 is in use, the main controller 14 detects a remaining capacity of the internal battery 13. If the remaining capacity of the internal battery 13 is smaller than a predetermined threshold, the main controller 14 controls the circuit connected to the internal discharge switch 12 so that the internal battery 13 is not used. The main controller 14 controls the internal discharge controller 11 to stop using the internal battery 13.

These operations are performed until the internal battery 13 and the external battery 17 are completely discharged. After the internal battery 13 and the external battery 17 are completely discharged, no more power is supplied to the apparatus.

With regard to a time at which the main controller 14 detects the remaining capacity of the internal battery 13 or the external battery 17 supplies the apparatus with power, the main controller 14 detects the remaining capacity of the internal battery 13 or the external battery 17 when the internal battery 13 or the external battery 17 is loaded.

In such instances, however, the remaining capacity levels of the internal battery 13 detected by the main controller 14 are ones that no-load voltages are not taken into consideration, which may cause undesirably repeated switching operations between the internal battery 13 and the external battery 17. As a result, unstable voltages may be applied to the apparatus.

FIG. 2 is a graphical representation of voltage curves 20 produced by a conventional apparatus having dual batteries. Referring to FIG. 2, reference numerals 22 and 24 represent voltage-versus-time plots indicating voltage levels for the internal battery 13 and the external battery 17, respectively, as detected by the main controller 14.

As described above, in the apparatus having the internal battery 13 and the external battery 17, the external battery 17 is first used and the internal battery 13 is then used depending on the discharge status of the external battery 17. Thus, the voltage levels for the internal battery 13 are maintained and the voltage levels for the external battery 17 decline over time.

When the voltage level of the external battery 17 becomes smaller than a predetermined threshold 26, the apparatus is configured such that power supply from the external battery 17 is interrupted and power supply from the internal battery 13 is initiated, that is, switching from the external battery 17 to the internal battery 13 occurs.

The voltage levels of the external battery 17 and the internal battery 13, which are detected by the main controller 14, may vary, depending on whether the load is applied to the external battery 17 or the internal battery 13. In other words, if the external battery 17 or the internal battery 13 is loaded, the voltage levels of the loaded one of the external battery 17 and the internal battery 13 will slightly decrease and the main controller 14 detects a corresponding voltage drop.

Accordingly, at an instant when power supply from the external battery 17 is interrupted and power supply from the internal battery 13 is initiated, connection of an electrical load with the external battery 17 is cut off and the remaining voltage capacity of the external battery 17 is slightly increased, as detected by the main controller 14. If the detected remaining voltage capacity is greater than the predetermined threshold 26, the main controller 14 controls power supply from the internal battery 13 to be interrupted and power supply from the external battery 17 to be initiated, by which switching from the external battery 17 to the internal battery 13 occurs.

However, the voltage level of the external battery 17 detected in a state in which the external battery 17 is unloaded is not reliable for use in performing switching. If an electrical load is connected to the external battery 17 as the result of switching from the external battery 17 to the internal battery 13 and again to the external battery 17, the voltage level of the external battery 17 is reduced again, meaning that switching from the external battery 17 to the internal battery 13 occurs again.

In other words, the main controller 14 which has detected a state in which the external battery 17 is unloaded and has considered the no-load voltages of the external battery 17 as being the remaining voltage capacity derived from the actual voltage levels, causes frequent switching operations between the internal battery 13 and the external battery 17, so that unstable voltages may be applied to the apparatus.

In Korean Published Application No. 1999-48426 a conventional controller generates an interruption signal produced by comparing an output voltage of a battery with a predetermined voltage and converting an operation mode from a shut-down mode to a normal mode only when a second interruption control signal is generated.

According to the conventional apparatus, a voltage level is monitored in a state in which the no-load voltage of the battery is taken into consideration, a second interruption generation signal is generated responsive to the monitored voltage level to switch from the shut-down mode to the normal mode. The conventional controller controls battery power switching in an apparatus using a single battery and makes no provision for controlling battery power switching between an internal battery and an external battery in a dual battery apparatus.

SUMMARY OF THE INVENTION

Aspects of the present invention provide an apparatus for and a method of controlling a battery discharge status, which can minimize a number of battery switching operations by detecting the remaining voltage capacity of each of a plurality of batteries for supplying a battery-powered electronic device with power.

According to an aspect of the present invention, an apparatus for controlling battery discharge includes an internal detecting unit detecting a remaining voltage capacity of an internal battery, an external detecting unit detecting a remaining voltage capacity of an external battery, a flag setting unit setting flags for the internal battery and the external battery according to predetermined conditions, and a control unit controlling a discharge status of at least one of the internal battery and the external battery by referring to the flags and the remaining voltage capacities of each of the internal battery and the external battery.

According to another aspect of the present invention, a method of controlling battery discharge includes detecting a remaining voltage capacity of an internal battery, detecting a remaining voltage capacity of an external battery, setting flags for the internal battery and the external battery according to predetermined conditions, and controlling a discharge status of at least one of the internal battery and the external battery by referring to the flags and the remaining voltage capacity of each of the internal battery and the external battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
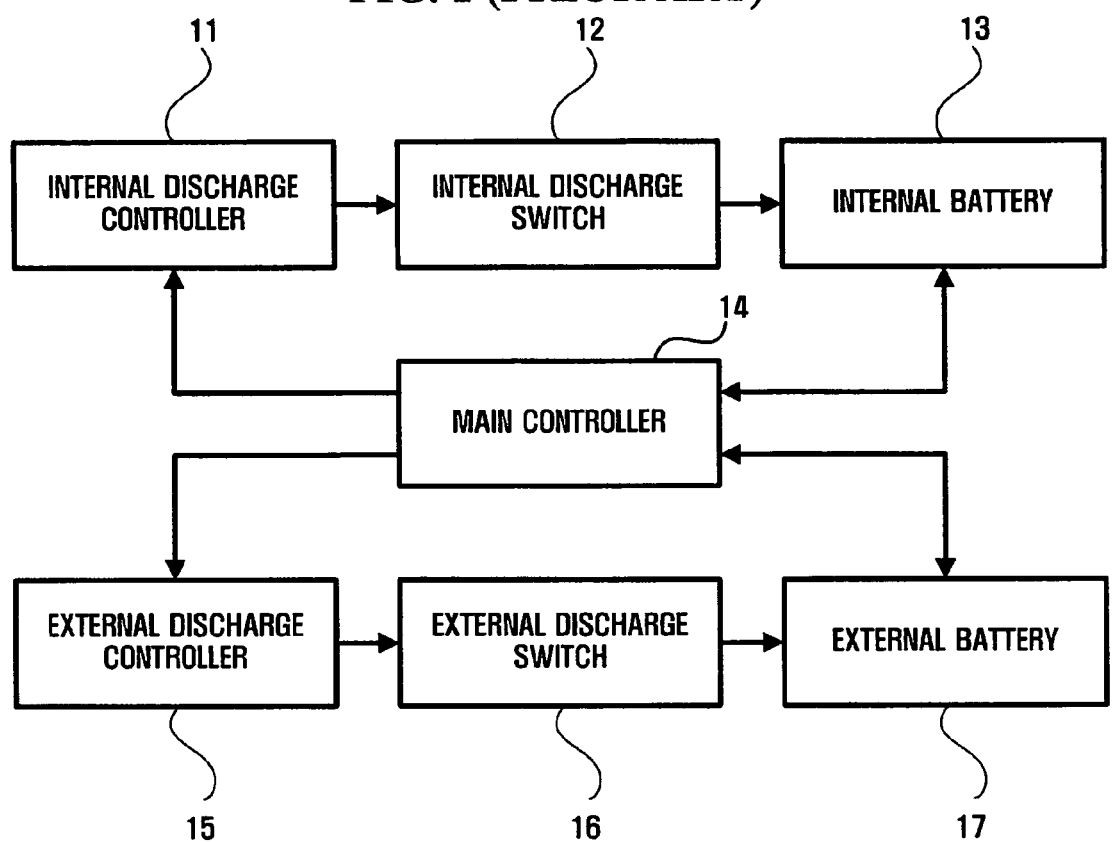
FIG. 1 is a block diagram of a conventional apparatus having dual batteries.
Figure 2:
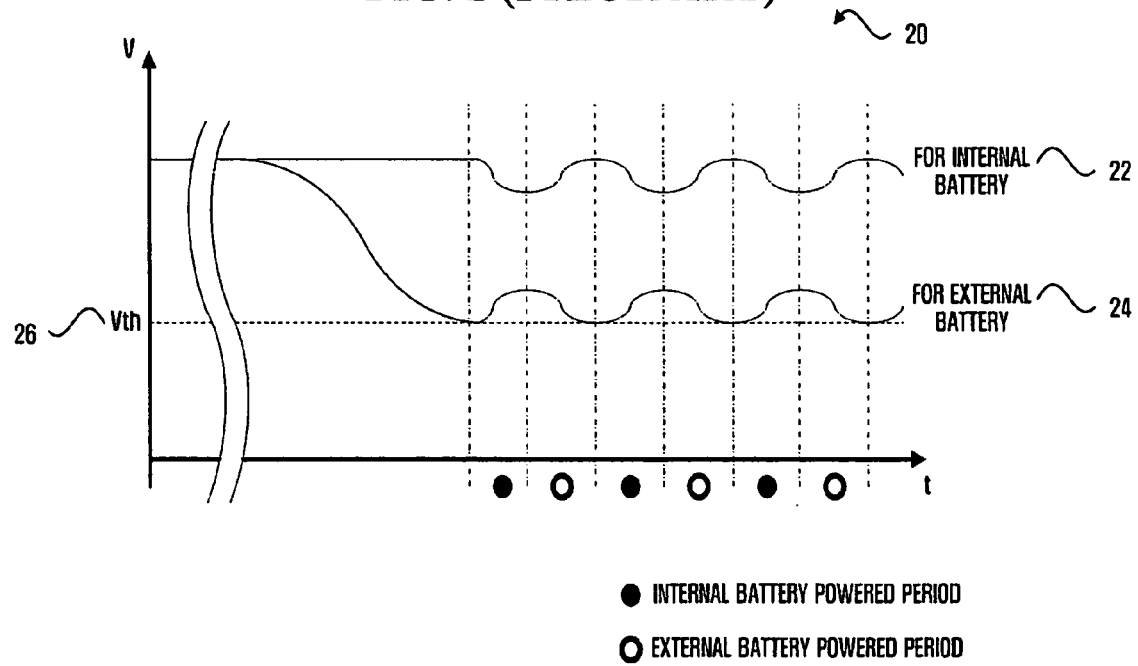
FIG. 2 is a graphical representation of voltage curves produced by a conventional apparatus having dual batteries.

Reference will now be made in detail to the embodiments of the present invention, examples of which are illustrated in the accompanying drawings, wherein like reference numerals refer to the like elements throughout. The embodiments are described below in order to explain the embodiments of the present invention by referring to the figures.

Figure 3:
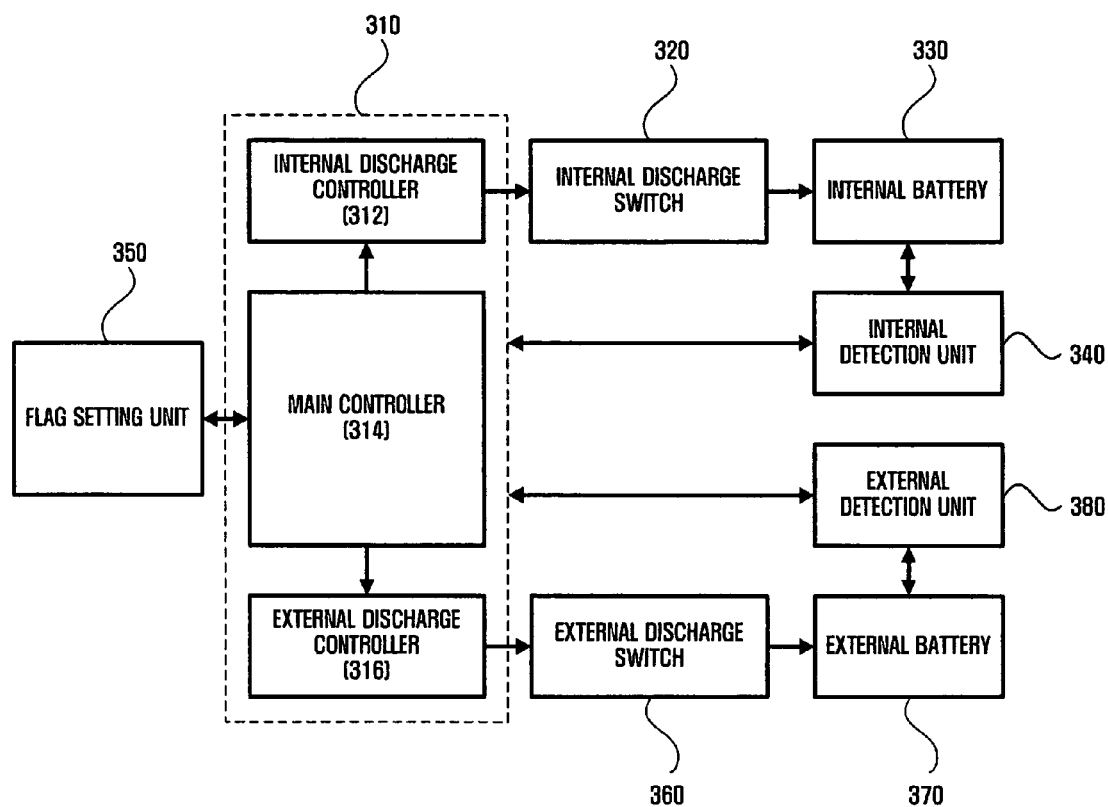
FIG. 3 is a block diagram of an apparatus for controlling battery discharge according to an embodiment of the present invention.

FIG. 3 is a block diagram of an apparatus for controlling battery discharge according to an embodiment of the present invention. The apparatus shown in FIG. 3 includes an internal battery 330, an external battery 370, an internal discharge switch 320, an external discharge switch 360, an internal detection unit 340, an external detection unit 380, a flag setting unit 350, and a control unit 310.

The internal battery 330 and the external battery 370 supply the apparatus with power. The external battery 370 is an element directly used by a user and may have various physical shapes. A shape of the internal battery 330 may depend upon the outer appearance of the apparatus.

The internal battery 330 and the external battery 370 may be rechargeable secondary batteries, such as a lead battery, a nickel cadmium battery, a nickel hydrogen battery, a nickel-metal hybrid battery, a lithium-ion battery, and a lithium-polymer battery. Where the internal battery 330 is a secondary battery, the internal battery 330 may be constantly supplied with power from an external power source.

The external battery 370 may be a primary battery, which is not rechargeable, according to a preference of a user.

The internal battery 330 and the external battery 370 may have a same output voltage. Therefore, the apparatus may be operated by one of the internal battery 330 and the external battery 370 or by both of the internal battery 330 and the external battery 370 connected in parallel.

If the internal battery 330 and the external battery 370 have different output voltages, circuits connected to the internal battery 330 and the external battery 370 are constructed differently so that the same voltage is supplied to the apparatus.

The internal discharge switch 320 and the external discharge switch 360 selectively turn on or off the circuit connected to the internal battery 330 and the external battery 370, respectively, to use or not use the internal battery 330 or the external battery 370. That is to say, the internal discharge switch 320 selectively closes or opens the circuit connected to the internal battery 330 to use or not to use the internal battery 330 and the external discharge switch 360 selectively closes or opens the circuit connected to the external battery 370 to use or not use the external battery 330.

The internal discharge switch 320 and/or the external discharge switch 360 may incorporate a diode (not shown) for protecting reverse flow of current and a capacitor (not shown) for preventing an over-voltage.

The internal detection unit 340 detects the remaining voltage capacity of the internal battery 330 and the external detection unit 380 detects the remaining voltage capacity of the external battery 370. As the remaining voltage capacity of the internal battery 330 and the external battery 370 decrease with use, the internal detection unit 340 and the external detection unit 380, respectively, detect voltage drops.

The operating performance of a typical electronic device operating by electrical energy may vary with an applied voltage level. If the voltage level drops to a predetermined value or less, the electronic device may not function properly.

In addition, if a battery charge is fully depleted, resulting in break-down of internal cells of the battery, the battery may be damaged.

To avoid malfunction or damage of the battery, the voltage of the battery should be maintained at a predetermined level value or higher. Accordingly, the internal detection unit 340 and the external detection unit 380 detect the remaining voltage capacity in real time so that the remaining voltage capacity of the internal battery 330 and the external battery 370 are prevented from decreasing to the predetermined level value or less.

In the embodiment shown in FIG. 3, the internal detection unit 340 and the external detection unit 380 detect the remaining voltage levels to two thresholds, i.e., first and second thresholds. The first threshold determines whether to operate the apparatus in a sleep mode and the second threshold determines whether to interrupt power supply to prevent the malfunction and damage of the internal battery 330 or the external battery 370.

When the remaining voltage capacity of the internal battery 330 or the external battery 370 is reduced to the first threshold or less, the apparatus operates in a sleep mode. During the sleep mode, only a restricted number of operations are available in the apparatus. Thus, to protect loss of information, supply of power must be completely interrupted. In the sleep mode, a user can store information and cut off power supply in a safe manner.

If the remaining voltage capacity of the internal battery 330 or the external battery 370 decreases to the second threshold or less due to a continuous use of the battery in the sleep mode, power from the internal battery 330 or the external battery 370 is not supplied any more.

In portable terminals, for example, the desirable first threshold is about 3.5V and the second threshold is about 3.0 V. However, the thresholds may vary depending on the circuit composition of the apparatus.

The remaining voltage capacities of the internal battery 330 and t the external battery 370, which are detected by the internal detection unit 340 and the external detection unit 380 are transmitted to the control unit 310.

The flag setting unit 350 sets flags for the internal battery 330 and the external battery 370 under predetermined conditions. The predetermined conditions include at least one selected from the group consisting of a detection status indicating whether the apparatus is in a sleep mode, a detection status indicating whether an adapter is available in the apparatus, a detection status indicating whether the external battery 370 is connected to the apparatus, a detection status indicating whether the remaining voltage capacity of the external battery 370 is greater than a first threshold in a state in which the external battery 370 is loaded, and a detection status indicating whether the remaining voltage capacity of the internal battery 330 is greater than the first threshold in a state in which the internal battery 330 is loaded.

The flags include an internal flag and an external flag. The internal flag determines the use of the internal battery 330, and the external flag determines the use of the external battery 370. The internal flag or the external flag may be set to 0 or 1.

When the apparatus is in a sleep mode, connected with an adapter or not connected with the external battery 370, the external flag is set to 0. When the remaining voltage capacity of the external battery 370 is not greater than the first threshold in a state in which the external battery 370 is loaded, the external flag is set to 1.

When the apparatus is in a sleep mode or connected with an adapter, the internal flag is set to 0. When the remaining voltage capacity of the internal battery 330 is not greater than the first threshold in a state in which the internal battery 330 is loaded, the internal flag is set to 1.

The flag setting unit 350 checks with the predetermined conditions in real time and transmits the set internal and external flags to the control unit 310.

The control unit 310 controls the discharge status of at least one of the internal battery 330 and the external battery 370 by referring to the remaining voltage capacity of each of the internal battery 330 and the external battery 370 transmitted from the internal detecting unit 340 and the external detecting unit 380, and the internal and external flags transmitted from the flag setting unit 350. In other words, one of the internal battery 330 and the external battery 370, which has a greater remaining voltage capacity than the other, or both of the internal battery 330 and the external battery 370, may be used in operating the apparatus. At this time, the predetermined conditions defined in the apparatus are checked.

When an external power source such as an adapter is connected to the apparatus, the control unit 310 controls the adapter to supply to the apparatus to save power consumption of the internal battery 330 and the external battery 370.

In addition, when the apparatus is provided with the external battery 370, the control unit 310 controls the external battery 370 to supply the apparatus to save power consumption of the internal battery 330. In this case, if the external flag is set to 1, power may be supplied from the internal battery 330. Alternatively, power supply may be performed using at least one of the internal battery 330 and the external battery 370 according to the checking result of the internal flag.

When the apparatus operates in a sleep mode, the control unit 310 compares the remaining voltage capacity of each of the internal battery 330 and the external battery 370 with the second threshold to determine whether to use the internal battery 330 and the external battery 370.

To accomplish such functions, the control unit 310 includes an internal discharge controller 312, an external discharge controller 316 and a main controller 314. The internal discharge controller 312 and the external discharge controller 316 control operations of the internal discharge switch 320 and the external discharge switch 360, respectively. That is, the internal discharge controller 312 and the external discharge controller 316 control switching on/off of the internal discharge switch 320 and the external discharge switch 360 as instructed by the main controller 314.

The main controller 314 receives the remaining voltage capacity of the internal battery 330 or the external battery 370 from the internal detecting unit 340 or the external detecting unit 380, and the internal and external flags from the flag setting unit 350, determines the discharge status of the internal battery 330 and the external battery 370, and transmits a determination result to the internal discharge controller 312 and the external discharge controller 316. The main controller 314 may perform overall control operations of the apparatus.

Figure 4A:
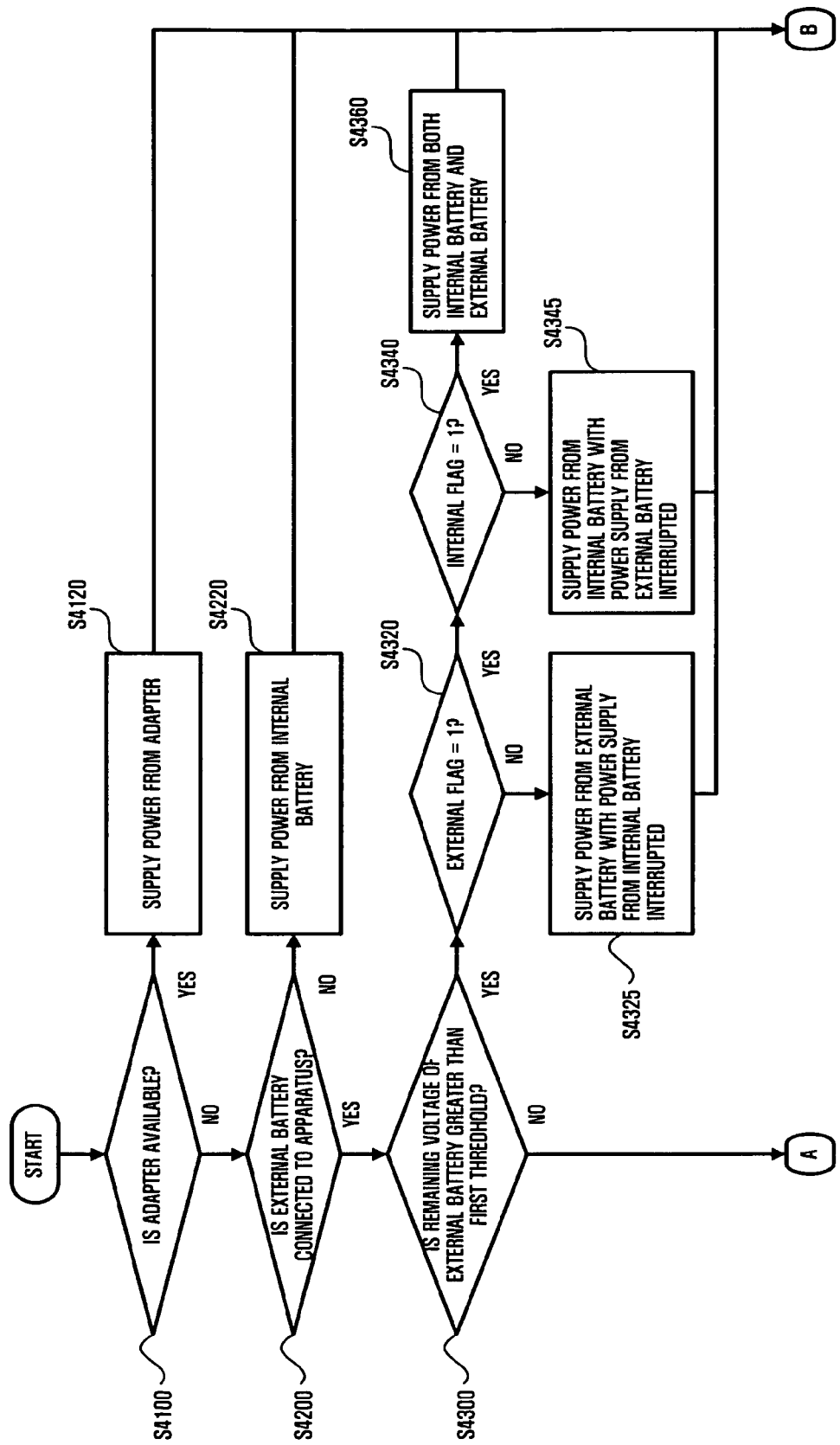
FIGS. 4A and 4B together form a flow chart illustrating a method of controlling battery discharge according to an embodiment of the present invention.
Figure 4B:
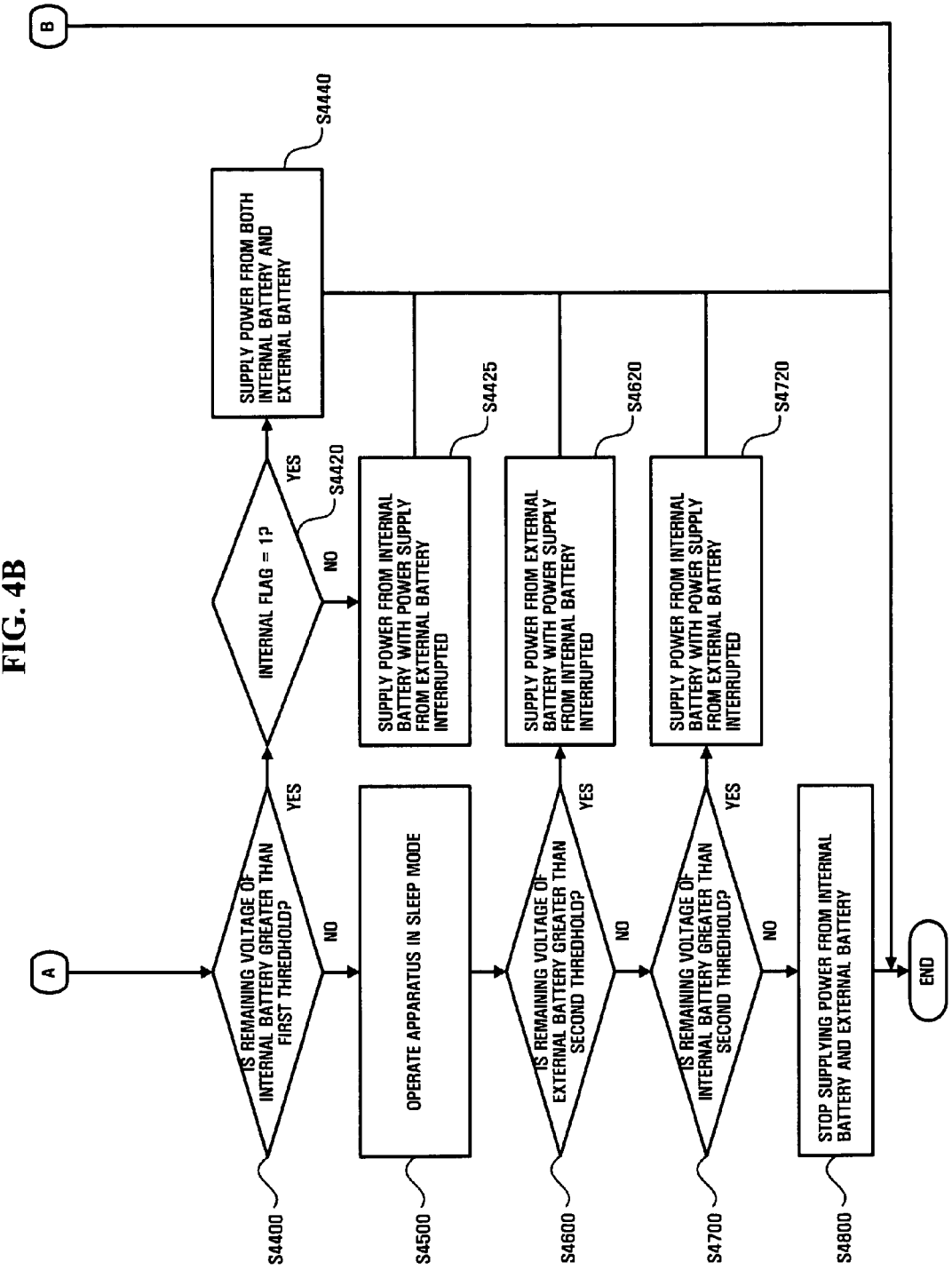

FIG. 4 is a flow charting illustrating a method of controlling battery discharge according to an embodiment of the present invention.

First, the control unit 310 detects whether an adapter is connected to an apparatus in operation S4100. If the adapter is connected to the apparatus, in order to save power consumption of the internal battery 330 and the external battery 370, power from the adapter is supplied to the apparatus in operation S4120. In this case, if one of the internal battery 330 and the external battery 370 is a secondary battery, i.e., a rechargeable battery, the rechargeable one of the internal battery 330 and the external battery 370 may be charged using power from the adapter.

When the adapter is provided in the apparatus, the flag setting unit 350 sets the internal flag and the external flag to 0.

If the adapter is not detected to be connected to the apparatus, the control unit 310 detects whether the external battery 370 is available in the apparatus in operation S4200. If the external battery 370 is not available in the apparatus, power from the internal battery 330 is supplied to the apparatus in operation S4220. If the external battery 370 is available in the apparatus, operation S4300 detects whether the remaining voltage capacity of the external battery 370 is greater than the first threshold.

When the remaining voltage capacity of the external battery 370 is greater than the first threshold, operation S4320 detects whether the external flag is set to 1. The flag setting unit 350 updates the external flag as explained in more detail below with respect to FIG. 6. If the remaining voltage capacity of the external battery 370 is greater than the first threshold in a state in which the external battery 370 is loaded, the flag setting unit 350 sets the external flag to 1. Thus, the detecting of the external flag in operation S4320 corresponds to detecting whether the remaining voltage capacity of the external battery 370 is not greater than the first threshold.

As the detection result, if the external flag is not 1, suggesting that the remaining voltage capacity of the external battery 370 is greater than the first threshold, in operation S4325, the control unit 310 controls the external battery 370 to supply power to the apparatus while interrupting power supply from the internal battery 330 to save power consumption of the internal battery 330.

If the external flag is 1, suggesting that the remaining voltage capacity of the external battery 370 is not greater than the first threshold, in operation S4340, the control unit 310 detects whether the internal flag is 1. The flag setting unit 350 updates the internal flag as explained in more detail below with respect to FIG. 5. If the remaining voltage capacity of the internal battery 330 is greater than the first threshold in a state in which the internal battery 330 is loaded, the flag setting unit 350 sets the internal flag to 1. Thus, the detecting of the internal flag in operation S4340 corresponds to detecting whether the remaining voltage capacity of the internal battery 330 is not greater than the first threshold.

As the detection result, if the internal flag is not 1, suggesting that the remaining voltage capacity of the internal battery 330 is greater than the first threshold, in operation S4345, the control unit 310 controls the internal battery 330 to supply power to the apparatus while interrupting power supply from the external battery 370 to save power consumption of the external battery 370.

As described above, when the external flag is 1, the internal flag is detected in operation S4340. If the internal flag is 1, suggesting that the remaining voltage capacity of the internal battery 330 and the remaining voltage capacity of the external battery 370 are both smaller than or equal to the first threshold, power supply from a single battery is not sufficient, and repeated switching between the internal battery 330 and the external battery 370 is expected, the control unit 310 controls both of the internal battery 330 and the external battery 370 to supply power to the apparatus in operation S4360.

If the remaining voltage capacity of the external battery 370 is not greater than the first threshold in operation S4300, the control unit 310 detects whether the remaining voltage capacity of the internal battery 330 is greater than the first threshold in operation S4400.

If the remaining voltage capacity of the internal battery 330 is greater than the first threshold, operation S4420 detects whether the internal flag is 1. The flag setting unit 350 updates the internal flag as described below with respect to FIG. 5. If the remaining voltage capacity of the internal battery 330 is not greater than the first threshold in a state in which the internal battery 330 is loaded, the control unit 310 sets the internal flag to 1. Thus, the detecting of the internal flag in operation S4420 corresponds to detecting whether the remaining voltage capacity of the internal battery 330 is not greater than the first threshold.

As the detection result, if the internal flag is not 1, suggesting that the remaining voltage capacity of the internal battery 330 is greater than the first threshold, the control unit 310, in operation S4425, controls the internal battery 330 to supply to the apparatus while interrupting power supply from the external battery 370 to save power consumption of the external battery 370.

If operation S4420 detects that the internal flag is 1, suggesting that the remaining voltage capacity of the internal battery 330 and the remaining voltage capacity of the external battery 370 are both smaller than or equal to the first threshold, power supply from a single battery is not sufficient, and repeated switching between the internal battery 330 and the external battery 370 is expected, the control unit 310 controls both of the internal battery 330 and the external battery 370 to supply power to the apparatus in operation S4440.

If the remaining voltage capacity of the internal battery 330 and the remaining voltage capacity of the external battery 370 are both smaller than or equal to the first threshold, the internal battery 330 or the external battery 370 may not function properly or may be damaged. To avoid this, the apparatus is operated in a sleep mode in operation S4500. Since the apparatus performs only a restricted number of operations during the sleep mode, a small amount of power is consumed in the sleep mode. Therefore, the apparatus may operate using only one of the internal battery 330 and the external battery 370 in the sleep mode. Then, the control unit 310 detects whether the remaining voltage capacity of the internal battery 330 and the external battery 370 are greater than the second threshold. In detail, the control unit 310 detects in operation S4600 whether the remaining voltage capacity of the external battery 370 is greater than the second threshold.

If the remaining voltage capacity of the external battery 370 is greater than the second threshold, the control unit 310 controls, in operation S4620, the external battery 370 to supply power to the apparatus while interrupting power supply from internal battery 330 to save power consumption of the internal battery 330.

When the remaining voltage capacity of the external battery 370 is smaller than or equal to the second threshold, the control unit 310 detects in operation S4700 whether the remaining voltage capacity of the internal battery 330 is greater than the second threshold. If the remaining voltage capacity of the internal battery 330 is greater than the second threshold, the control unit 310 controls, in operation S4720, the internal battery 330 to supply power to the apparatus while interrupting power supply from the external battery 370.

Finally, if it is detected in operation S4700 that the remaining voltage capacity of the internal battery 330 is not greater than the second threshold, the control unit 310 controls both the internal battery 330 and the external battery 370 to stop supplying power to the apparatus in operation S4800.

Figure 5:
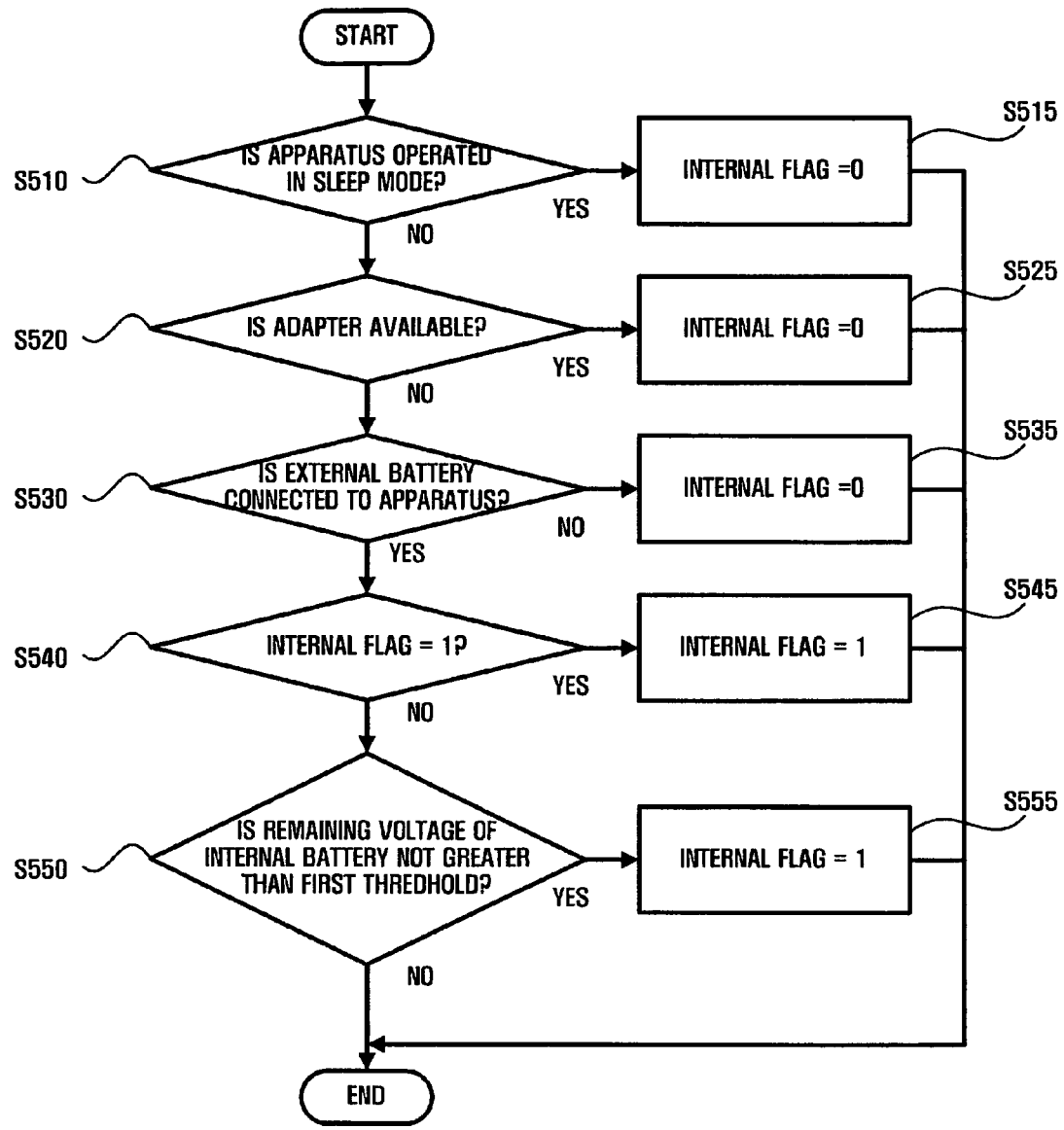
FIG. 5 is a flow charting illustrating a process of setting an internal flag according to an embodiment of the present invention.

FIG. 5 is a flow charting illustrating a process of setting an internal flag according to an embodiment of the present invention.

To set a value of the internal flag, the flag setting unit 350 checks first whether the apparatus is in a sleep mode in operation S510.

If the apparatus is in the sleep mode, the internal flag is set to 0 in operation S515. If the apparatus is not in the sleep mode, operation S520 detects whether the apparatus is connected to an adapter.

If the apparatus is connected to the adapter, the internal flag is set to 0 in operation S525. If the apparatus is not connected to the adapter, operation S530 detects whether the external battery 370 is connected to the apparatus.

If the external battery 370 is not connected to the apparatus, the internal flag is set to 0 in operation S535. If the external battery 370 connected to the apparatus, the current internal flag is detected in operation S540.

If the present internal flag is 1, the internal flag is held at 1 in operation S545 until a particular event happens, the particular event includes connecting the adapter, entering into a sleep mode, and connecting or disconnecting the external battery 370. If the internal flag is 0, operation S550 detects whether the remaining voltage capacity of the internal battery 330 is not greater than the first threshold.

If the remaining voltage capacity of the internal battery 330 is not greater than the first threshold, the internal flag is set to 1 in operation S555. If the remaining voltage capacity of the internal battery 330 is greater than the first threshold, the setting of the internal flag is terminated.

The setting of the internal flag by the flag setting unit 350 may be performed in the above-described order, or in real time according to each of the predetermined conditions. In other words, the flag setting unit 350 does not set the internal flag after detecting the predetermined conditions over time, but sets the internal flag only when each of the predetermined conditions is met, as shown in FIG. 5. For example, if power from the adapter is not available in the apparatus, the detecting of the remaining voltage capacity of the internal battery 330 being not greater than the first threshold, that is, comparing the remaining voltage capacity of the internal battery 330 with the first threshold, is not immediately performed but is occasionally performed.

Figure 6:
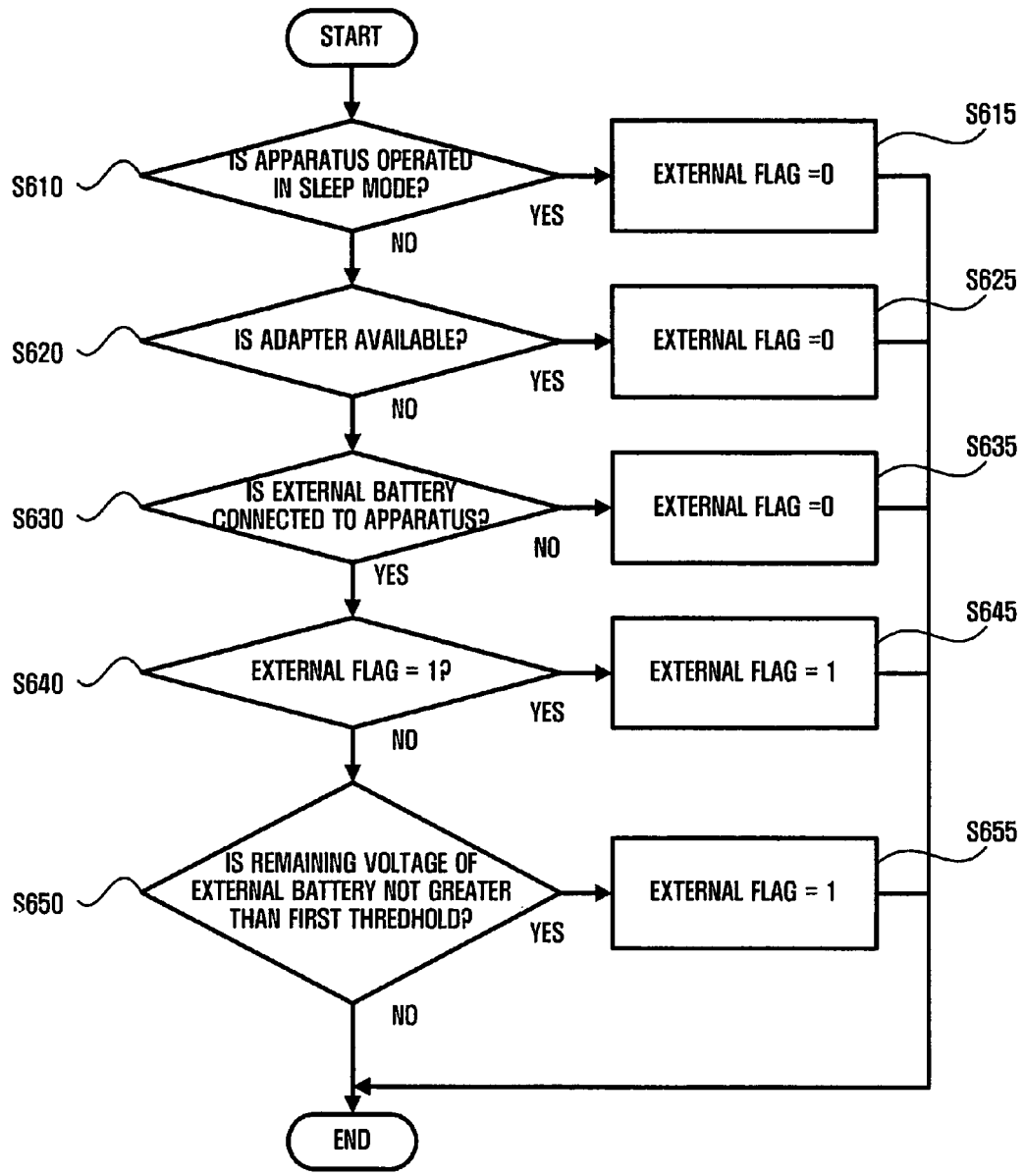
FIG. 6 is a flow charting illustrating a process of setting an external flag according to an embodiment of the present invention.

FIG. 6 is a flow charting illustrating a process of setting an external flag according to an embodiment of the present invention.

To set a value of the external flag, the flag setting unit 350 checks first whether the apparatus is in a sleep mode in operation S610.

If the apparatus is in the sleep mode, the external flag is set to 0 in operation S615. If the apparatus is not in the sleep mode, operation S620 detects whether the apparatus is connected to an adapter.

If the apparatus is connected to the adapter, the external flag is set to 0 in operation S625. If the apparatus is not connected to the adapter, operation S630 detects whether the external battery 370 is connected to the apparatus.

If the external battery 370 is not connected to the apparatus, the external flag is set to 0 in operation S635. If the external battery 370 is connected to the apparatus, the current external flag is detected in operation S640.

If the current external flag is 1, the external flag is held at 1 in operation S645 until a particular event happens, the particular event includes connecting the adapter, entering into a sleep mode, and connecting or disconnecting the external battery 370. If the external flag is 0, operation S650 detects whether the remaining voltage capacity of the external battery 370 is not greater than the first threshold.

If the remaining voltage capacity of the external battery 370 is not greater than the first threshold, the external flag is set to 1 in operation S655. If the remaining voltage capacity of the external battery 370 is greater than the first threshold, the setting the external flag is terminated.

The setting the external flag by the flag setting unit 350 may be performed in the above-described order, or in real time according to each of the predetermined conditions. In other words, the flag setting unit 350 does not set the internal flag after detecting the predetermined conditions over time, but sets the internal flag only when each of the predetermined conditions is met, as shown in FIG. 6. For example, if an adapter is not connected to the apparatus, connection or disconnection of the external battery 370 is not immediately detected but is occasionally detected.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for controlling battery discharge comprising:
   an internal detecting unit detecting a remaining voltage capacity of an internal battery;
   an external detecting unit detecting a remaining voltage capacity of an external battery;
   a flag setting unit setting an internal flag for the internal battery and an external flag for the external battery according to predetermined conditions; and
   a control unit controlling a discharge status of at least one of the internal battery and the external battery by referring to the flags and a remaining voltage capacity of each of the internal battery and the external battery.

2. The apparatus of claim 1, wherein the predetermined conditions include at least one selected from the group consisting of a first detection status indicating whether the apparatus is in a sleep mode, a second detection status indicating whether an adapter is connected to the apparatus, a third detection status indicating whether the external battery is connected to the apparatus, a fourth detection status indicating whether the remaining voltage capacity of the external battery is greater than a first threshold in a state in which the external battery is loaded, and a fifth detection status indicating whether the remaining voltage capacity of the internal battery is greater than the first threshold in a state in which the internal battery is loaded.

3. The apparatus of claim 2, wherein the control unit controls the discharge status of the internal battery and the external battery using the flags.

4. The apparatus of claim 2, wherein when the apparatus is in the sleep mode, the control unit controls a discharge status of the at least one of the internal battery and the external battery by referring to a sixth detection status indicating whether the remaining voltage capacity of the external battery is greater than a second threshold and a seventh detection status indicating whether the remaining voltage capacity of the internal battery is greater than the second threshold.

5. The apparatus of claim 2, wherein the setting of the external flag comprises:
setting the external flag to a first state when the first detection status indicates that the apparatus is in the sleep mode, when the second detection status indicates that the adapter is connected to the apparatus, or when the third detection status indicates that the external battery is not connected to the apparatus; and
setting the external flag to a second state, when a remaining voltage capacity of the external battery is not greater than a first threshold.

6. The apparatus of claim 5, wherein the setting of the internal flag comprises:
setting the internal flag to the first state when the first detection status indicates that the apparatus is in the sleep mode, when the second detection status indicates that the adapter is connected to the apparatus, or when the third detection status indicates that the external battery is not connected to the apparatus; and
setting the internal flag to the second state, when a remaining voltage capacity of the internal battery is not greater than the first threshold.

7. The apparatus of claim 6, further comprising:
an external discharge switch, wherein:
where the remaining voltage capacity of the external battery is greater than the first threshold and the current state of the external flag is not the second state, the control unit controls the external discharge switch to supply the apparatus with power from the external battery.

8. The apparatus of claim 6, further comprising:
an internal discharge switch, wherein:
where the remaining voltage capacity of the external battery is greater than the first threshold, the current state of the external flag is the second state, and the current state of the internal flag is not the second state, the control unit controls the internal discharge switch to supply the apparatus with power from the internal battery.

9. The apparatus of claim 6, further comprising:
an internal discharge switch; and
an external discharge switch, wherein:
where the remaining voltage capacity of the external battery is greater than the first threshold, the current state of the external flag is the second state, and the current state of the internal flag is the second state, the control unit controls the internal discharge switch and the external discharge switch to supply the apparatus with power from both the internal battery and the external battery.

10. The apparatus of claim 5, further comprising:
an internal discharge switch, wherein:
where the remaining voltage capacity of the external battery is not greater than the first threshold, the remaining voltage capacity of the internal battery is greater than the first threshold and the current state of the internal flag is not the second state, the control unit controls the internal discharge switch to supply the apparatus with power from the internal battery.

11. The apparatus of claim 5, further comprising:
an internal discharge switch; and
an external discharge switch, wherein:
where the remaining voltage capacity of the external battery is not greater than the first threshold, the remaining voltage capacity of the internal battery is greater than the first threshold and the current state of the internal flag is the second state, the control unit controls the internal discharge switch and the external discharge switch to supply the apparatus with power from both the internal battery and the external battery.

12. The apparatus of claim 5, wherein:
where the remaining voltage capacity of the external battery is not greater than the first threshold and the remaining voltage capacity of the internal battery is not greater than the first threshold, the control unit controls the apparatus to operate in the sleep mode.

13. The apparatus of claim 11, further comprising:
an external discharge switch, wherein:
where the remaining voltage capacity of the external battery is greater than a second threshold, the control unit controls the external discharge switch to supply the apparatus with power from the external battery.

14. The apparatus of claim 11, further comprising:
an internal discharge switch, wherein:
where the remaining voltage capacity of the external battery is not greater than a second threshold and the remaining voltage capacity of the internal battery is greater than the second threshold, the control unit controls the internal discharge switch to supply the apparatus with power from the internal battery.

15. The apparatus of claim 11, further comprising:
an internal discharge switch; and
an external discharge switch, wherein:
where the remaining voltage capacity of the external battery is not greater than a second threshold and the remaining voltage capacity of the internal battery is not greater than the second threshold, the control unit controls the internal discharge switch and the external discharge switch to remove all power from the apparatus.

16. A method of controlling battery discharge comprising:
detecting a remaining voltage capacity of an internal battery;
detecting a remaining voltage capacity of an external battery;
setting an internal flag for the internal battery and an external flag for the external battery according to predetermined conditions; and
controlling a discharge status of at least one of the internal battery and the external battery by referring to the flags and the remaining voltage capacity of each of the internal battery and the external battery and the flags.

17. The method of claim 16, wherein the predetermined conditions include at least one selected from the group consisting of a detection status indicating whether the apparatus is in a sleep mode, a detection status indicating whether an adapter is connected to the apparatus, a detection status indicating whether the external battery is connected to the apparatus, a detection status indicating whether the remaining voltage capacity of the external battery is greater than a first threshold in a state in which the external battery is loaded, and a detection status indicating whether the remaining voltage capacity of the internal battery is greater than the first threshold in a state in which the internal battery is loaded.

18. The method of claim 17, wherein the controlling of the discharge status comprises controlling the internal battery and the external battery using the flags.

19. The method of claim 17, wherein when the apparatus is in the sleep mode, the controlling of the discharge status comprises controlling the at least one of the internal battery and the external battery by referring to the detection status indicating whether the remaining voltage capacity of the external battery is greater than a second threshold and a detection status indicating whether the remaining voltage capacity of the internal battery is greater than the second threshold.

20. The method of claim 17, wherein the setting of the external flag comprises:
    setting the external flag to a first state when the first detection status indicates that the apparatus is in the sleep mode, when the second detection status indicates that the adapter is connected to the apparatus, or when the third detection status indicates that the external battery is not connected to the apparatus; and
    setting the external flag to a second state, when the remaining voltage capacity of the external battery is not greater than a first threshold.

21. The method of claim 20, wherein the setting of the internal flag comprises:
    setting the internal flag to the first state when the first detection status indicates that the apparatus is in the sleep mode, when the second detection status indicates that the adapter is connected to the apparatus, or when the third detection status indicates that the external battery is not connected to the apparatus; and
    setting the internal flag to the second state, when a remaining voltage capacity of the internal battery is not greater than the first threshold.

22. The method of claim 20, further comprising:
    where the remaining voltage capacity of the external battery is greater than the first threshold and the current state of the external flag is not the second state, supplying the apparatus with power from the external battery.

23. The method of claim 21, further comprising:
    where the remaining voltage capacity of the external battery is greater than the first threshold, the current state of the external flag is the second state, and the current state of the internal flag is not the second state, supplying the apparatus with power from the internal battery.

24. The method of claim 21, further comprising:
    where the remaining voltage capacity of the external battery is greater than the first threshold, the current state of the external flag is the second state, and the current state of the internal flag is the second state, supplying the apparatus with power from both the internal battery and the external battery.

25. The method of claim 20, further comprising:
    where the remaining voltage capacity of the external battery is not greater than the first threshold, the remaining voltage capacity of the internal battery is greater than the first threshold and the current state of the internal flag is not the second state, supplying the apparatus with power from the internal battery.

26. The method of claim 20, further comprising:
    where the remaining voltage capacity of the external battery is not greater than the first threshold, the remaining voltage capacity of the internal battery is greater than the first threshold and the current state of the internal flag is the second state, supplying the apparatus with power from both the internal battery and the external battery.

27. The method of claim 20, further comprising:
    where the remaining voltage capacity of the external battery is not greater than the first threshold and the remaining voltage capacity of the internal battery is not greater than the first threshold, operating the apparatus in the sleep mode.

28. The method of claim 27, further comprising:
    where the remaining voltage capacity of the external battery is greater than a second threshold, supplying the apparatus with power from the external battery.

29. The method of claim 27, further comprising:
    where the remaining voltage capacity of the external battery is not greater than a second threshold and the remaining voltage capacity of the internal battery is greater than the second threshold, supplying the apparatus with power from the internal battery.

30. The method of claim 27, further comprising:
    where the remaining voltage capacity of the external battery is not greater than a second threshold and the remaining voltage capacity of the internal battery is not greater than the second threshold, removing all power from the apparatus.

31. A method of controlling battery discharge in an apparatus operable from an internal battery, an external battery and an adapter, the method comprising:
    occasionally determining whether the adapter is connected to the apparatus and respective remaining voltages of the internal battery and the external battery;
    operating the apparatus exclusively from the external battery, if the adapter is not connected to the apparatus and the remaining voltage of the external battery is greater than a first threshold; and
    performing switching to exclusively operate the apparatus from the internal battery, if the remaining voltage of the external battery becomes not greater than the first threshold and the remaining voltage of the internal battery is greater than the first threshold; and
    inhibiting a reversion to exclusively operating the apparatus from the external battery, if the remaining voltage of the external battery increases to greater than the first threshold due to unloading of the external battery after performing the switching to the internal battery.

32. The method of claim 31, further comprising:
    performing switching to operate the apparatus from both the internal battery and the external battery if the remaining voltage of the internal battery becomes not greater than the first threshold; and
    inhibiting a reversion to exclusively operating the apparatus from the internal battery, if the remaining voltage of the internal battery increases to greater than the first threshold due to reducing a load of the internal battery.

33. The method of claim 31, further comprising:
    if the remaining voltage of the external battery is not greater than the first threshold, and the remaining voltage of the internal battery is not greater than the first threshold, operating the apparatus in a sleep mode.

34. The method of claim 33, further comprising:
    operating the apparatus exclusively from the external battery, if the remaining voltage of the external battery is not greater than the first threshold and greater than a second threshold.

35. The method of claim 33, further comprising:
    if the remaining voltage of the external battery is not greater than a second threshold but less than the first threshold and the remaining voltage of the internal battery is greater than the second threshold but not greater than the first threshold, operating the apparatus exclusively from the internal battery.

36. The method of claim 33, further comprising:
if the remaining voltage of the external battery is not greater than a second threshold but less than the first threshold and the remaining voltage of the internal battery is not greater than the second threshold,
stopping operation of the apparatus.

37. An apparatus operable from an internal battery, an external battery and an adapter, the apparatus comprising:
a first detector detecting a remaining voltage capacity of the internal battery;
a second detector detecting a remaining voltage capacity of the external battery; and
a control unit occasionally determining whether the adapter is connected to the apparatus and respective remaining voltages of the internal battery and the external battery, wherein the control unit controls the apparatus to:
exclusively operate from the external battery, if the adapter is not connected to the apparatus and the remaining voltage of the external battery is greater than a first threshold; and
perform switching to exclusively operate the apparatus from the internal battery, if the remaining voltage of the external battery becomes not greater than the first threshold and the remaining voltage of the internal battery is greater than the first threshold; and
inhibit a reversion to exclusive operation of the apparatus from the external battery, if the remaining voltage of the external battery increases to greater than the first threshold due to unloading of the external battery after switching to the internal battery.

38. The apparatus of claim 37, wherein the control unit controls the apparatus to:
perform switching to operate the apparatus from both the internal battery and the external battery, if the remaining voltage of the internal battery becomes not greater than the first threshold; and
inhibit a reversion to exclusive operation of the apparatus from the internal battery, if the remaining voltage of the internal battery increases to greater than the first threshold due to reducing a load of the internal battery.

39. The apparatus of claim 37, wherein:
if the remaining voltage of the external battery is not greater than the first threshold, and the remaining voltage of the internal battery is not greater than the first threshold, the control unit controls the apparatus to operate in a sleep mode.

40. The apparatus of claim 39, wherein the control unit controls the apparatus to operate exclusively from the external battery, if the remaining voltage of the external battery is not greater than the first threshold but greater than a second threshold.

41. The apparatus of claim 39, wherein:
if the remaining voltage of the external battery is not greater than a second threshold but less than the first threshold and the remaining voltage of the internal battery is greater than the second threshold but not greater than the first threshold, the control unit controls the apparatus to operate exclusively from the internal battery.

42. The apparatus of claim 39, wherein:
if the remaining voltage of the external battery is not greater than a second threshold but less than the first threshold and the remaining voltage of the internal battery is not greater than the second threshold, the control unit stops operation of the apparatus.

* * * * *